Patented Feb. 18, 1930

1,747,987

UNITED STATES PATENT OFFICE

WARREN T. REDDISH, OF CINCINNATI, OHIO, ASSIGNOR TO THE KONTOL COMPANY, OF DALLAS, TEXAS, A CORPORATION OF TEXAS

ART OF TREATING EMULSIONS

No Drawing. Application filed September 27, 1928. Serial No. 308,887.

This invention relates to a process of separating petroleum and water, and is particularly directed to removing water from the petroleum and water emulsions which are encountered in the oil producing fields.

The object of this invention is to provide a reagent which has a very marked breaking effect upon the emulsions being treated, which causes the components of the emulsion to coalesce rapidly, which can be easily shipped and handled in closed containers and which can be readily introduced into and dispersed throughout the emulsion.

The bodies to the use of which this application is particularly directed are the alkyl and/or aryl hydroxy amines, relatively new products commercially. They are relatively stable liquids and quite water soluble. They comprise the nitrogen atom to which is attached one or more alkyl or aryl groups or radicals containing one or more hydroxyl groups. The other nitrogen variances may be satisfied by hydrogen atoms or by alkyl or aryl groups or radicals which may contain or may be devoid of hydroxyl groups. The following formulas are given for purpose of illustration and to identify the members of this general class:

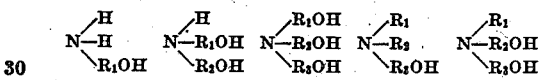

in which R represents an alkyl or aryl group. Some particular members of this group which have been used to advantage in breaking emulsions are the mono, di and tri-ethanol amines.

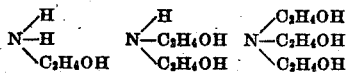

These products are quite expensive at present, and the cost has been but recently reduced to proportions permitting their use in the oil fields.

Tri-ethanol amine is particularly adapted for emulsion breaking since it is soluble in both phases of the emulsion and therefore distributes itself rapidly therethrough.

These reagents are particularly effective when used in combination with the reagent described in the United States Letters Patent to Rogers, No. 1,299,385, issued April 1, 1919, since they together seem to resolve certain emulsions far less sensitive to either alone. The preferred Rogers reagent is water soluble mineral oil sodium sulphonate.

About ten parts of the Rogers reagent are used to one part of the hydroxy amine. This combination provides a reagent capable of meeting commercial competition on the present costs of production and is particularly effective on the emulsions known as "stubborn emulsions."

The hydroxy amines can be used with the Rogers reagent in aqueous solution, thinned with alcohol, or the Rogers reagent can be dehydrated to a water content of less than ten per cent and the reagents thinned with coal tar distillates or petrolic distillates such as kerosene.

Bitumen having a melting point between 35° and 95° C. as tested by the ball and ring method of the American Society for Testing Materials Specifications, or mineral oil, oil layer sulphonates can also be used with the hydroxy amines and Rogers reagent.

Preferably one part reagent is used to one thousand parts emulsion though the percentage can be varied according to the emulsion being treated. The emulsion is preferably heated to a temperature of from 150° to 200° F. until the break takes place and coalescence is under way, after which the components of the emulsion are stratified by settling, filtering, centrifugal machinery or other well known means.

One reagent which has proved effective comprises:

40 parts mineral oil sludge layer sodium sulphonate (dehydrated).
10 parts tri-ethanol amine.
60 parts bitumen and/or oil layer mineral oil sulphonates.
25 parts kerosene.

Having described my invention, I claim:

1. A body adapted to decompose emulsions of petroleum and water, said body comprising, mineral oil sulphonates and hydroxy amines.

2. A body adapted to decompose emulsions of petroleum and water, said body comprising, mineral oil sulphonates, hydroxy amines and bitumen.

3. A body adapted to decompose emulsions of petroleum and water, said body comprising, material oil sulphonates and tri-ethanol amine.

4. A body adapted to decompose emulsions of petroleum and water, said body comprising, mineral oil sulphonates, tri-ethanol amine and bitumen.

5. A process of decomposing petroleum and water emulsions, said process comprising, distributing throughout said emulsions a body containing mineral oil sulphonates and hydroxy amines.

6. A process of decomposing petroleum and water emulsions, said process comprising, distributing throughout said emulsions a body containing mineral oil sulphonates and tri-ethanol amine.

7. A process of decomposing petroleum and water emulsions, said process comprising, distributing throughout said emulsions a body containing mineral oil sulphonates, hydroxy amines and bitumen.

8. A process of decomposing petroleum and water emulsions, said process comprising, distributing throughout said emulsions a body containing mineral oil sulphonates, tri-ethanol amine and bitumen.

In witness whereof, I hereunto subscribe my name.

WARREN T. REDDISH.